Figure 1:
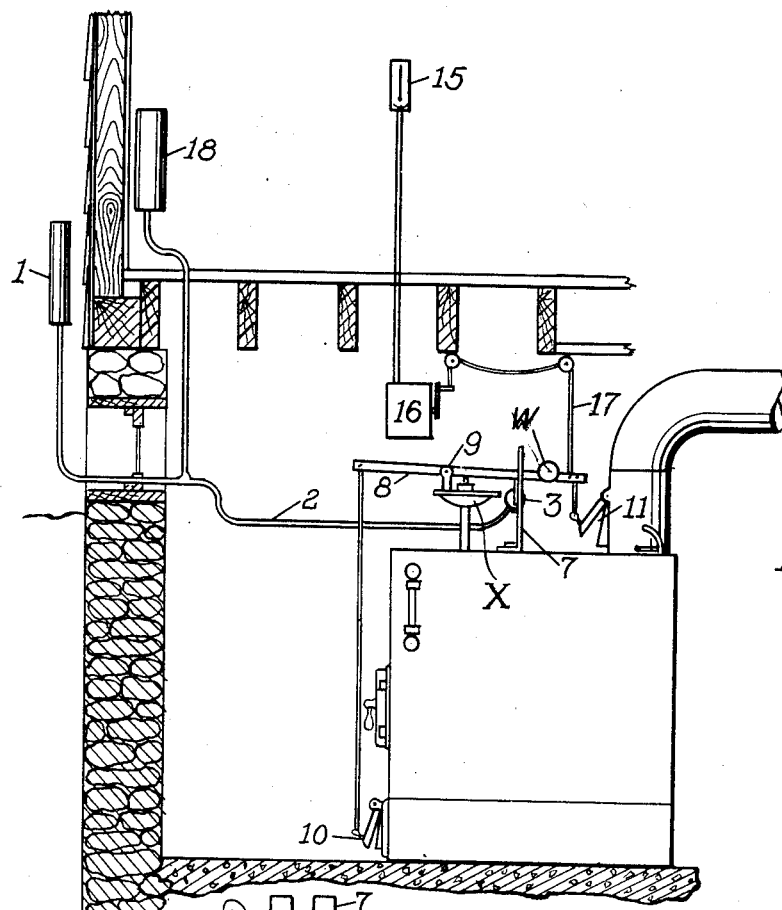

Dec. 19, 1933.   W. P. E. AINSWORTH   1,939,640
STOP LIMIT CONTROL FOR FIRING EQUIPMENT
Filed Sept. 7, 1932

INVENTOR
BY William P. E. Ainsworth
Shoemaker, Riley Packard & Mattare
ATTORNEYS Patented Dec. 19, 1933

1,939,640

UNITED STATES PATENT OFFICE 1,939,640

STOP LIMIT CONTROL FOR FIRING EQUIPMENT

William P. E. Ainsworth, North Tarrytown, N. Y.

Application September 7, 1932. Serial No. 632,059

12 Claims. (Cl. 236—91)

This invention relates to apparatus for limiting according to outside temperature conditions the maximum firing or heating effect of firing equipment such as is employed in or for heating plants for buildings, houses, apartment houses, dwellings, or the like, and which firing equipment is in general otherwise controlled as to its firing effects according to conditions other than the outside temperature conditions, as for example, according to the temperature conditions within a room or compartment of the building being heated.

An object of the invention is to provide in conjunction with firing equipment for household or like heating apparatus a limit stop which is associated with an outside thermostat—to wit, a thermostat normally located on the exterior of the building being heated—that functions to position the limit stop so that the firing equipment cannot function to produce a firing effect beyond a maximum as thus set or determined by the limit stop even though other control apparatus for the firing equipment would tend to produce a firing effect beyond that permitted or determined by the limit stop as positioned by the outside thermostat.

According to another aspect of the invention, the firing equipment has control apparatus therefor, operating means for controlling or causing the functioning of the control apparatus, and room thermostat functionally associated with the operating means, and which apparatus is characterized in that it is provided with a limit stop that is under the control of an outside thermostat and is positionable thereby so as to limit the maximum firing effect of the heating equipment according to outside temperature conditions.

Another object of the invention is to further provide a limit stop in association with control apparatus of a firing equipment and which limit stop is functionally operated by the combined effect of associated or directly connected inside and outside thermostats whereby, according to the component influence of the inside and outside temperatures, the maximum firing effect of the firing equipment is limited according to the position of a limit stop which is under the control of the associated inside and outside thermostats.

With these and other objects in view, the invention consists in the novel construction, combination and arrangement of parts hereinafter more fully described, illustrated in the accompanying drawing, and pointed out in the claims hereto appended, it being understood that various changes in the form, proportion, and minor details of construction, within the scope of the claims, may be resorted to without departing from the spirit or sacrificing any of the advantages of the invention.

Reference will now be made to the accompanying drawing which constitutes a part of this specification. In said drawing:

Figure 1 indicates a section of a building having in the cellar or basement thereof any suitable type of heating installation from which heat is supplied in any usual or suitable manner to the rooms or apartments within the building. In the arrangement or system of this figure, there are shown customary air inlet and check control dampers positionable by a controlling apparatus that comprises a pivotally mounted bar operatively associated with the dampers and which controlling apparatus has associated therewith operating means for controlling the position of the pivotal bar by functioning of a room thermostat. There is also shown in this figure, a limit stop device associated with the pivoted bar and which limit stop device is controlled by or according to the functioning of an outside thermostat to limit the maximum amount of air supplied to the furnace or, in other words, to limit the maximum firing effect of the firing equipment as a whole.

Figure 2:
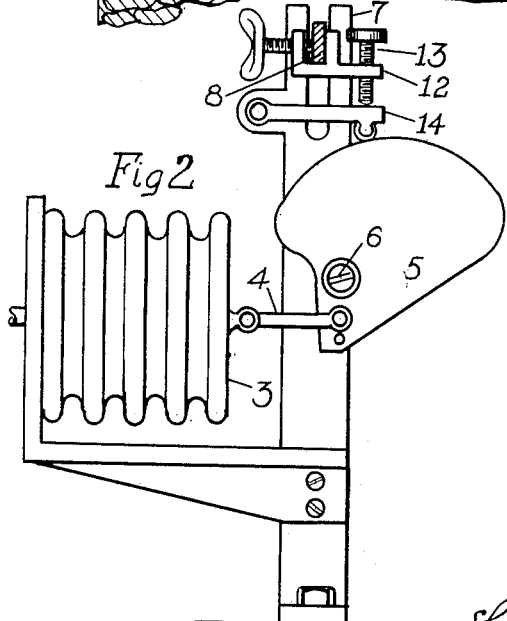

Fig. 2 is a detail view, at a somewhat larger scale than is shown in Figure 1, of the limit stop employed to limit the movement of the pivotal bar of the controlling mechanism of Figure 1. The limit stop of Figure 2 is a positionable member and in this figure, there is also shown a bellows motor that is directly connected to the positionable limit stop and which bellows motor, when installed, is operatively connected to an outside thermostatic means so as to be functionally operated by and according to the condition of the outside thermostatic means.

As previously indicated, and as is readily seen from the drawing, the limit stop of Figure 2 directly engages the pivoted damper controlling or positioning bar of Figure 1 and this direct engagement is relied upon to limit the maximum amount of air and thereby the maximum firing effect of the fuel burning or firing equipment of Figure 1 according to outside temperature conditions.

The apparatus or system of Figure 1 is designed to operate in conjunction with any type of room or house thermostat used to regulate the temperature within a dwelling or building. The object in connection with this arrangement or system is to regulate the maximum firing effect of the firing equipment or in other words, the maximum rate of combustion of coal or other fuel, within the furnace of the building heating equipment or within or by the firing instrumentality of the heating equipment depending upon the temperature outside of the house by allowing the dampers that control the air inflow to only partially open assuming the room or house thermostat may then be opened when the outside temperature is relatively high and permitting said air control dampers to open wider when the outside temperature is lower.

Economy of fuel will result from a more constant combustion rate instead of fuel cycles wherein dampers are at one time wide open and at the next time closed tightly under control of inside conditions without having a maximum firing effect imposed thereupon corresponding to outside temperature conditions. A closer approach to a uniform and constant temperature within a dwelling or building is experienced by the ability of the arrangement shown herein to balance the rate of fuel burning with the heat losses from the inside to the outside of the house or dwelling which is a function of the difference in the temperaures within and without the building or dwelling. In the arrangement of Figure 1, the stop latch functions by direct engagement with the pivoted bar connecting the dampers.

The system or arrangement according to the present invention comprises as an important feature thereof a sealed container—constituting a part of an outside thermostat—located on the exterior of the building and containing a gas or fluid, such as a suitable mixture of water and alcohol or any other suitable liquid, the expansion or contraction of which communicates, through a tube of small diameter, a corresponding expansion or contraction to a bellows or bellows motor. This bellows or bellows motor in turn actuates a stop latch or stop mechanism which acts either directly or indirectly on or in respect to the furnace dampers. In short, the limit stop construction and associated outside thermostat establish for any outside temperature condition a corresponding position of the boiler dampers beyond which they cannot pass when the room or house thermostat tends to open them or to allow them to open, and this even though the functioning of the room thermostat would otherwise tend to move said dampers or to allow them to move beyond the stop limiting position.

According to the system or arrangement of Figure 1, the limit stop is applied directly to the damper control of a natural draft furnace and is entirely structurally independent of the house or room thermostat. In this system, a container or outside thermostat 1 containing the expansible fluid is connected through the medium of a small diameter tube 2 to the bellows or bellows motor 3. The movable or free end of the bellows 3 is connected by an adjustable link 4 with a cam providing a stop latch 5 which turns about a spindle 6 on a standard 7. A damper rod or bar 8 is pivotally mounted at 9 and is connected at one end with an underfire or air inlet damper 10 and at the other end with a check damper 11. The pivoted damper rod 8 moves in a path confined within a fork or between spaced forked members provided at or in the upper part of the standard 7. A clip 12 is clamped to the damper rod 8 and carries adjusting screw 13 which provides an adjustable contact through a pivoted roller arm 14 with the cam 5. A room or house thermostat is shown at 15 and a thermostatically controlled motor at 16. The motor 16 is connected as by chain or cable 17 of the damper rod 8 so as to operate and position the damper rod. Container 18 is a thermostat preferably located within but near the outside wall of the house to effect a modifying influence on the ouside thermostat. The thermostat 18 may in effect be considered as part of the outside thermostatic means and it may be more specifically referred to as the modifying thermostat. It contains an expansible fluid and is connected into tubing 2, previously referred to.

It will be observed that the pivoted rod 8 may be considered as a part of the damper controlling mechanism of the firing equipment of Figure 1 and that the mechanism which includes the room or house thermostat and the motor 16 may be broadly considered as thermostatically controlled motor operating means for operating and positioning and for controlling the functioning of the controlling mechanism that includes the bar 8. In the heating apparatus shown in Figure 1, there is indicated at X any suitable mechanism for operating—that is, for lifting the right-hand end of—bar 8 for consequently positioning the bar 8 when a rise of pressure—or temperature—takes place within the heater. The means indicated at X may be or may comprise the ordinary yielding rubber disk construction frequently employed. The operation of this mechanism X does not effect the functioning of the stop limit mechanism or cam but the cam merely determines the extreme position of or for the bar 8 and that according to the outside temperature conditions. It will also be noted that the stop latch 5 constitutes a limit stop mechanism that is directly associated with the controlling mechanism or bar 8 thereof, in fact the stop latch or cam 5 may be described as offset in respect to or located at one side of the pivotal axis of the damper control rod or bar 8 and it also may be described as located and mounted so as to be transversely positionable in respect to and across the path of movement of the rod or bar 8.

The operation of the system or arrangement of Figures 1 and 2 is as follows: When the outside temperature drops, the fluid within the container or outside thermostat contracts, causes bellows 3 to contract, and causes cam or stop latch 5 (shown more clearly in Fig. 2) to rotate clockwise a predetermined amount. The pivoted roller arm 14 drops downward due to the curvature of the cam. When temperature within the house falls below a point or temperature for which the room thermostat is set, it causes the motor to operate and to move the pivoted bar and open the air drafts; in other words, to open the air damper and close the stack or check damper. In opening the underfire or air damper, and closing the check damper, the damper rod or bar 8 drops in guide fork of standard 7 until the screw 13 contacts with the cam or stop latch 5 through the medium of roller arm 14.

When outside temperature rises, the reverse happens, that is, cam 5 turns counterclockwise and when damper rod is actuated to open drafts, it is restricted in its downward movement by virtue of the fact that roller arm 14 is raised by stop action of the cam. This permits only a partial opening of the air or underside damper 10 and partial closing of the check damper 11.

The normal position for the firing equipment will arbitrarily be assumed and referred to as that which the parts occupy for obtaining the full or maximum firing effect, namely, that position in which, through the medium of the damper control bar 8, the air inlet damper 10 is held in its full or maximum open position and the stack or check damper 11 is left in its full or completely closed position.

It will be also noted that the weight W on the damper controlling rod 8 is positioned so that it causes the rod 8 to be held in said normal position, or to be restored to said normal position, when otherwise free to do so. It will also be noted that the house or room thermostat mechanism which collectively may be considered as including the thermostat 15, the motor 16, and the chain or cable 17, functions to cause movement of the damper controlling rod 8—sometimes referred to as the damper control rod—in a manner to move the dampers from full firing position to fire retarding position as and when the room temperature reaches or exceeds a predetermined amount, at which time and under which conditions, the thermostat functions to cause the motor 16 of the thermostat or thermostatic mechanism to operate in a manner to move the damper control rod 8 so as to correspondingly close the air inlet damper 10 and open the stack damper 11.

It will also be noted that as and when the room temperature drops below the predetermined amount, the motor 16 functions to allow the damper rod 8 to move to or toward its normal or full firing position if the rod is otherwise free to do so.

It will also be noted that the stop cam construction, which includes cam 5, and which is sometimes arbitrarily referred to as the stop latch construction, is operatively connected to and is under the control of the outside thermostat 1 and associated bellows motor 3 in such a manner that if and when the outside temperature is high, the cam or limit stop 5 functions to allow only a limited movement of the damper control rod 8 toward normal or full firing position, and in which instance, the air inlet damper 10 can be opened only slightly or partially and the stack damper 11 will be correspondingly held partially opened. It will also be clear that with a lower, or lowering of the temperature on the outside of the building, the outside thermostatic means positions the cam or limit stop 5 so that the firing equipment can be operated for a greater firing effect, to wit, for a firing effect according to outside temperature conditions.

In the event of the room or house thermostat having been adjusted to permit of a lower temperature during the night, it is conceivable even with relatively high outside temperature that increased opening of the dampers can be permitted and fuel burning accelerated to recover normal house temperature quickly. This is obtained by a modification of or inclusion in the system or arrangement of figures of a device consisting of a second container or thermostat—the modifying thermostat—placed within the house and having sufficient volume or capacity to permit substantial contracting of the bellows 3 at a temperature in the house of, for example, 60 degrees Fahrenheit, or thereabouts, regardless of the temperature outside.

An important factor of the present invention is to obtain a stop damper regulation or limiting firing control applicable to or for use in or with the numerous types of thermostatically controlled apparatus that are in commercial use today.

What is claimed is:

1. In combination with a firing equipment for a furnace of a household heating system or the like, a firing equipment control apparatus therefor comprising a pivotally mounted damper rod having an air inlet damper operated from one end thereof and a check draft damper operated from the other end thereof, operating means for positioning the firing equipment control apparatus, a room thermostat connected so that upon a drop in the room temperature to a determined temperature the thermostat functions, whereby the operating means functions in a manner tending to position the firing equipment control apparatus to increase the combustion effect within the furnace and so that upon an increase in the room temperature to a determined temperature the thermostat functions whereby the operating means functions in a manner tending to position the firing equipment control apparatus to decrease the combustion effect within the furnace, a limit stop located in offset relationship in respect to the fulcrum axis of the pivotally mounted damper rod and functionally associated with respect to said damper rod, and an outside thermostat connected to the limit stop in such a manner that when the outside temperature rises to a certain temperature the outside thermostat functions to position the limit stop so that the pivoally mounted damper rod of the firing equipment control apparatus cannot be moved beyond a limited position at which the maximum firing effect is limited according to the outside temperature and this even though there exists a tendency for movement of the firing equipment control apparatus to increase the firing effect—beyond the limited effect—because of the functioning of the room thermostat following a drop in the temperature within the room.

2. In a heating system having a furnace with a firing grate, an air inlet leading to the fire grate, a combustion gas offtake, a positionable damper for regulating the air inlet, a check damper for regulating the supply of air to the combustion gas offtake, a pivotally mounted damper control rod functionally cooperated with said air damper and said check damper, means for automatically moving said damper control rod about its pivotal axis at one time in one direction to open the air damper and close the check damper and at another time in a reverse direction to close said air damper and open said check damper, a limit stop positionable so as to be engaged by the damper control rod at a place at one side of the pivotal axis of the damper control rod, and an outside thermostat operatively connected with said limit stop and functioning to position said limit stop in respect to the damper control rod so that to the latter there can be imparted only a limited maximum movement tending to open the air damper and close the check damper even though the means for automatically moving said damper control rod tends to move or is constructed so as to allow movement of the rod beyond said stop limited position.

3. The combination of parts as defined in and by claim 1, in which the limit stop has several functioning positions and is moved to said positions by the functioning of the outside thermostat according to the temperature of the outside atmosphere.

4. In combination with a pivoted damper control bar, operating means for positioning said damper control bar, a room thermostat for controlling the functioning of said operating means, limit stop means arranged so as to be in the path of the control bar and located at one side of the pivotal axis of said bar, and an outside thermostat for positioning the limit stop means according to the temperature conditions of the outside atmosphere, the limit stop being associated with the damper control rod in such a manner as to limit the movement of the damper control rod in one direction even though the operating means would otherwise tend to move the bar in the same direction beyond its stop limited position.

5. A combination as defined in the claim last preceding, in which the limit stop is positioned by the outside thermostat according to the outside temperature but is modified as to its functioning position by an inside thermostat directly functionally associated with the outside thermostat and said limit stop.

6. In combination, damper controlling means comprising a pivotally mounted damper bar by and from which dampers are positioned, operating means under the control of a room thermostat for operating the damper controlling means, an outside thermostat, a limit stop, and means operated under the control of the outside thermostat for positioning the limit stop, said limit stop being directly functionally associated with the pivotally mounted bar of the damper controlling means which said limit stop is transversely positionable across the path of movement of the damper bar and is located at one side of the pivotal axis of said damper bar.

7. A combination as defined by the claim last preceding wherein the limit stop comprises a positionable cam, and in which the damper controlling means has said pivotally mounted bar through which the operating movement is transmitted to the dampers, and which said pivotally mounted bar is directly associated with said positionable cam and is limited as to its effective operative movement by and according to the position of said cam.

8. In combination with a pivoted damper control bar, operating means for positioning said damper control bar, limit stop means arranged so as to be in the path of the control bar and located at one side of the pivotal axis of said bar, and an outside thermostat for positioning the limit stop means according to the temperature conditions of the outside atmosphere, the limit stop being associated with the damper control rod in such a manner as to limit the movement of the damper control rod in one direction even though the operating means would otherwise tend to move the bar in the same direction beyond its stop limited position.

9. A stop latch construction for employment with a pivotally mounted damper controlling or positioning rod of a furnace firing equipment, which latch construction comprises in combination a frame member adapted to be fixedly positioned in respect to the furnace structure, a cam pivotally mounted on said frame, an expansion bellows motor mounted on said frame, a link between the free end of said bellows motor and said cam, whereby the latter is positioned according to the position of the free end of the bellows motor, a hollow thermostat member for containing an expansible fluid and a tube for providing a connection between the interior of said thermostat and the interior of said bellows.

10. A thermostatically controlled stop latch construction for use in connection with a firing equipment for a furnace of a household heating system or the like and which firing equipment comprises a pivotally mounted damper rod having an air inlet damper operated from one end of the rod and a check draft damper operated from the other end of the rod, which stop latch construction comprises in combination a frame member adapted to be fixedly positioned in respect to the furnace structure, a cam pivotally mounted on said frame and positionable so as to be operatively associated with said damper rod, an expansible bellows motor associated with said frame, means between the free end of the bellows motor and said cam for positioning said cam according to the position of the free end of said bellows motor, a hollow thermostatic member for containing an expansible fluid, and a tubular member for providing a connection between the interior of said thermostatic member and the interior of said bellows motor.

11. In a heating system having a furnace with a firing equipment therefor, an air supply leading to the firing equipment, a combustion gas off-take, a positionable damper means for regulating the air supply, a pivotally mounted damper control rod for alternatively positioning said damper means, means for automatically moving said damper control rod about its pivotal axis at one time in one direction to position the damper means for increased air supply and at another time in a reverse direction to position the damper means for decreased air supply, a positive limit stop positionable so as to be engaged by the damper control rod at a place at one side of the pivotal axis of the damper control rod, and an outside thermostat operatively connected with said limit stop, said outside thermostat functioning to position said limit stop in respect to the damper control rod so that to the latter there can be imparted only a limited maximum movement to a position tending to increase the air supply even though the means for automatically moving said damper control rod tends to move or is constructed so as to allow movement of the rod beyond said stop limited position.

12. In combination with a firing equipment for a furnace of a household or other heating system wherein a fluid heating medium is employed, a firing equipment control apparatus comprising a pivotally mounted damper rod suitably connected to draft control means of the furnace whereby the rate of combustion of the furnace is accordingly controlled, which pivotally mounted damper rod is positioned on or in proximity to the heating system, operating means for positioning said firing equipment control apparatus, a positionable positive limit stop located in offset relationship to the fulcrum axis of the pivotally mounted damper rod, an outside thermostat, and means operatively controlled by said outside thermostat for positioning said limit stop according to outside temperature conditions in such a manner as to prevent the firing equipment control apparatus from exceeding a predetermined firing effect within the furnace of the heating system and this even though operating means for positioning said firing equipment control apparatus may tend to increase the firing effect beyond the determined firing effect.

WILLIAM P. E. AINSWORTH.